United States Patent [19]
Kotzin et al.

[11] Patent Number: 5,796,722
[45] Date of Patent: Aug. 18, 1998

[54] METHOD AND APPARATUS FOR DYNAMIC LOAD BALANCING USING HANDOFF

[75] Inventors: Michael D. Kotzin, Buffalo Grove; Philip J. Fleming, Glen Ellyn; Aleksandr L. Stolyar, Buffalo Grove, all of Ill.

[73] Assignee: Motorola, Inc., Schaumburg, Ill.

[21] Appl. No.: 649,093

[22] Filed: May 17, 1996

[51] Int. Cl.⁶ ............................................. H04Q 7/36
[52] U.S. Cl. .......................... 370/252; 370/332; 455/453
[58] Field of Search ........................... 370/252, 317–321, 370/329–335, 342, 343, 437, 465; 455/33.1, 33.2, 34.1, 34.2, 63, 67.3, 436, 438, 439, 442, 447, 453

[56] References Cited

U.S. PATENT DOCUMENTS

| | | |
|---|---|---|
| 4,670,899 | 6/1987 | Brody et al. ............... 455/453 |
| 5,241,686 | 8/1993 | Charbonnier ............... 455/453 |
| 5,497,504 | 3/1996 | Acampora et al. ............ 455/33.2 |
| 5,574,974 | 11/1996 | Almgren et al. ............ 455/34.1 |
| 5,592,470 | 1/1997 | Rudrapatna et al. ............ 370/468 |

*Primary Examiner*—Melvin Marcelo
*Attorney, Agent, or Firm*—Richard A. Sonnentag

[57] ABSTRACT

To mitigate the adverse affects of the load imbalance phenomenon prevalent in spread spectrum, multi-carrier wireless communication systems, the system beneficially employs the use of handoff as a means for balancing the call traffic (commonly referred to as "load") among a plurality of carriers within the communication system. The multi-carrier wireless communication system monitors a plurality of metrics corresponding to the loading of each of the plurality of carriers in the communication system and, based upon the metrics, will handoff call traffic to and between the plurality of carriers, thereby mitigating the adverse effects associated with the load imbalance, in accordance with the invention.

8 Claims, 3 Drawing Sheets

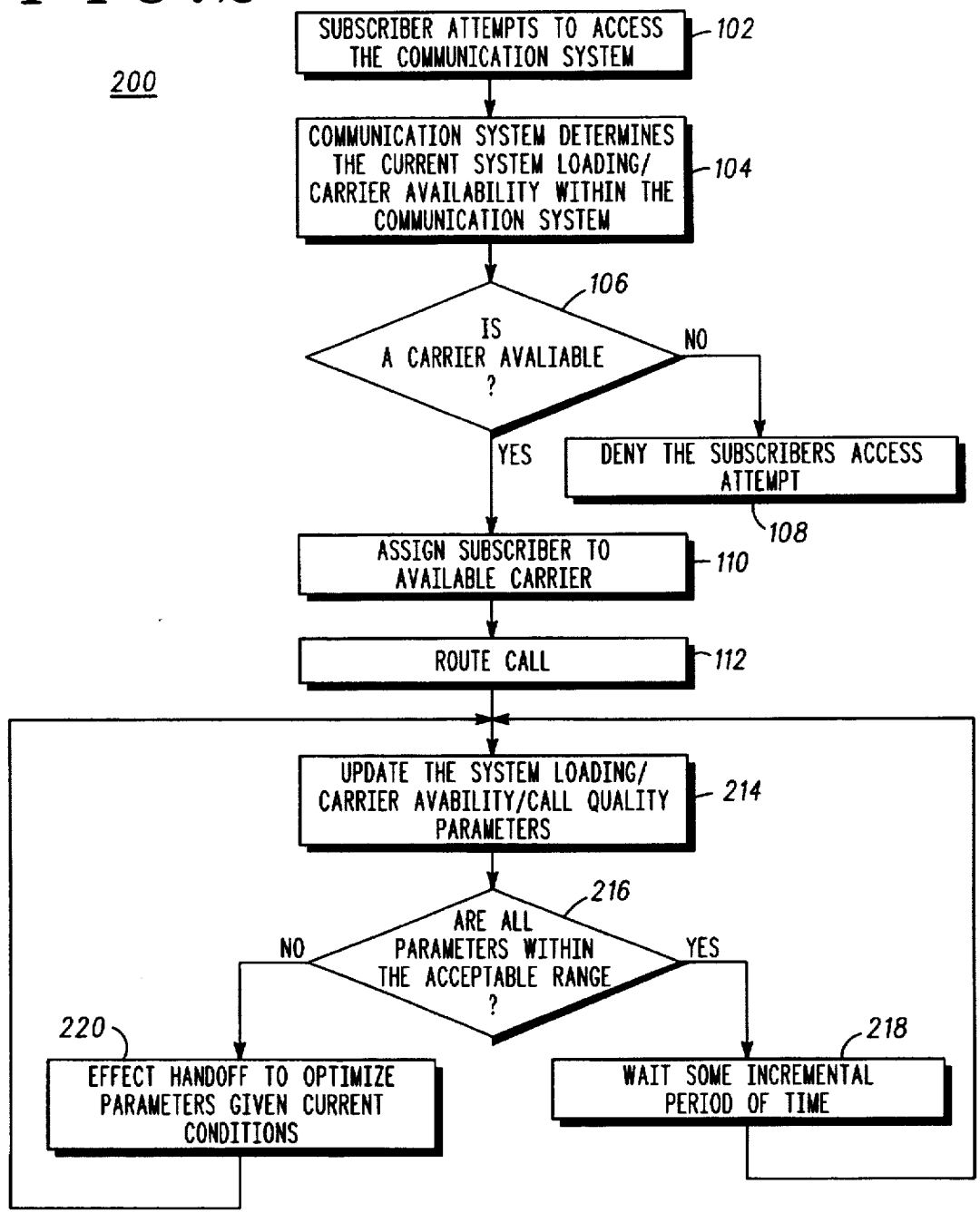

METHOD AND APPARATUS FOR DYNAMIC LOAD BALANCING USING HANDOFF

FIELD OF THE INVENTION

The present invention relates generally to wireless communication systems and, more particularly, to a method and apparatus for load balancing using handoff.

BACKGROUND OF THE INVENTION

Wireless communication systems are well known and consist of many types including land mobile radio, cellular radiotelephone (inclusive of analog cellular, digital cellular, personal communication systems (PCS) and wideband digital cellular systems), and other communication system types. In cellular radiotelephone communication systems, for example, a number of communication cells are typically comprised of base stations (BS's), generally linked to one or more base station controller(s) (BSC) forming a base station system (BSS). The BSC's are, in turn, linked to a mobile switching center (MSC) which provides a connection between the BSS and a public switched telephone network (PSTN), as well as interconnection to other BSS's. Remote communication units (or mobile stations) (MS) inclusive of all types and styles of moveable/portable radio's, operating within the communication cells, transmit signals to (reverse link) and receive signals from (downlink) the serving BSS. The signals are processed by the BS, BSC and MSC to complete a communication transaction with another MS, or through the PSTN to a land-line telephone user.

As described above, the base station, provides the RF interface (often referred to as a carrier) between the subscriber and the wireless communication system via one or more transceiver(s). The operational characteristics of the carrier are a function of the modulation scheme of the particular communication system. For example, in analog wireless communication systems, a carrier is comprised of a single frequency accommodating one subscriber, whereby interference among the subscribers is minimized by dispersing the carriers throughout the available spectrum. In time division, multiple access (TDMA) digital communication systems, a carrier occupies a single frequency, however the carrier is divided into a number of timeslots and is capable of handling as many subscribers as there exist timeslots. In the analog and TDMA systems, the communication system balances load in a static fashion. Restated, the loading of the system is predetermined through frequency allocation and frequency reuse patterns employed for the communication system.

In spread spectrum systems, such as code division, multiple access (CDMA) wireless communication systems, the carriers occupy a broad band frequency of several megahertz, wherein a number of subscribers are resident on a single carrier occupying a corresponding number of channels (communication resources) which are separated by a unique, quasi-orthogonal code sequence. In this system, the number of channels available on each carrier is not static, but is variable dependent on the amount of resource used by each of the subscribers. The reason for such variability is that in a system where a number of carriers are occupying the same frequency simultaneously, the transmit power associated with each subscriber is "noise" for the other subscribers on the same carrier. The phenomenon wherein the transmit power associated with each subscriber is effectively additional noise for the other subscribers on the same carrier within a CDMA system is often referred to as system "rise". Therefore, the capacity of such a carrier is typically related to the energy per bit (Eb) required to overcome the system rise (No) to provide a suitable quality level (e.g. a particular frame erasure rate).

In the non-spread spectrum systems described above, the communication systems typically balanced the call traffic (or load) among the plurality of carriers within the system at call initiation. That is, based on the general location of the subscriber at call initiation, the system allocates an available carrier to handle the call. However, field experience has shown that to merely balance the load at call initiation in a multi-carrier spread spectrum communication system may lead to a load imbalance.

Load imbalance is defined as a situation where, after assignment of subscribers to carriers, a first carrier in a system is supporting a significantly larger subscriber population than other carriers within the system. Under such conditions, the carrier supporting a large number of subscribers must do so at a power premium, the result of which is heightened system rise. Whereas the capacity of these systems is defined as the number of subscribers the system may support (Eb/No) to provide a predetermined quality level, it becomes clear that any situation which unduly increases the system rise (No) has a corresponding negative effect on system capacity. Field experience has shown that this load imbalance causes some carriers to be so overloaded that they deliver poor voice quality to subscribers, while other carriers within the same network have excess capacity available. During peak usage periods, this problem may be so pronounced that calls may be dropped from one carrier, while other available carriers within the system are not even used.

Thus a need exists for a method and apparatus to dynamically balance call traffic among the carriers within the communication system.

BRIEF DESCRIPTION OF THE DRAWINGS

FIG. 2 generally depicts, in flow diagram form, a preferred embodiment for balancing the traffic load among a plurality of carriers within a multi-carrier wireless communication system performed in accordance with the invention;

DETAILED DESCRIPTION OF THE PREFERRED EMBODIMENT

Figure 1:
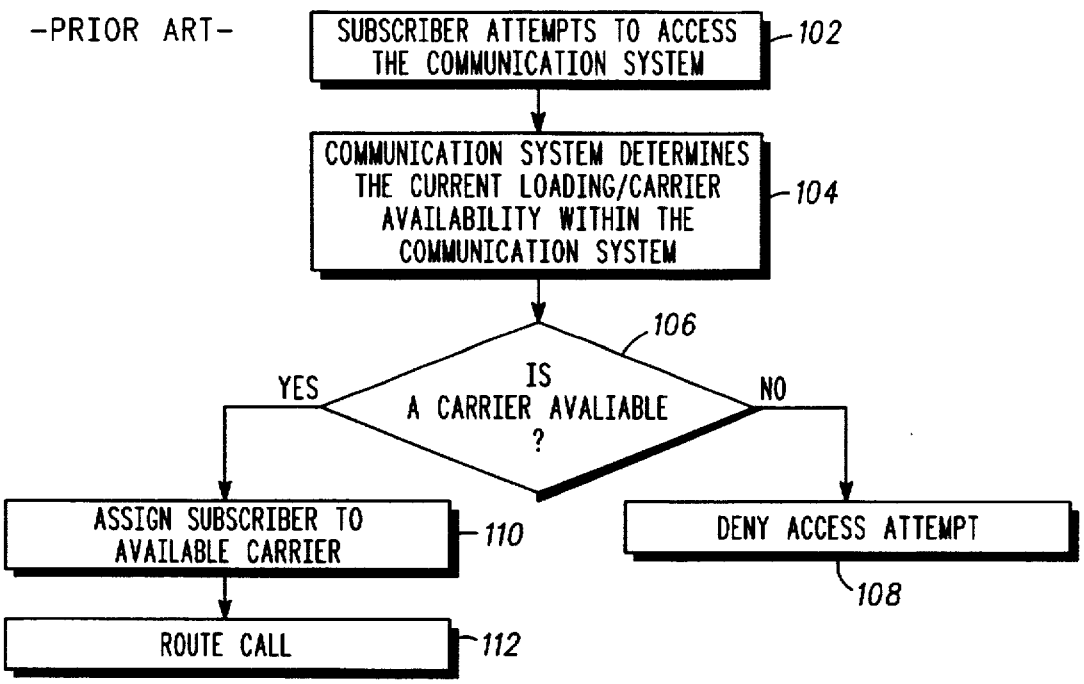
FIG. 1 generally depicts, in flow diagram form, a prior art method for balancing the traffic load among a plurality of carriers within a multi-carrier wireless communication system.

In order to mitigate the adverse affects of the load imbalance phenomenon described above, a multi-carrier wireless communication system beneficially employs the use of handoff as a means for balancing the call traffic (commonly referred to as "load") among a plurality of carriers within the communication system. The multi-carrier wireless communication system monitors a plurality of metrics corresponding to the loading of each of the plurality of carriers in the communication system and, based upon the metrics, hands-off call traffic to and between the plurality of carriers, thereby improving the capacity and call-quality of the communication system.

In a first embodiment, a method for dynamically balancing the load in a multi-carrier wireless communication system using handoff is disclosed, the method comprising the steps of first, monitoring a metric of the wireless communication system which corresponds to the quantity and/or quality of the load on a first of a plurality of carriers. The system evaluates the metric and, if appropriate, it will identify a second carrier which has excess capacity available. Once a second carrier has been identified, the communication system will select a suitable subscriber candidate resident on the first carrier to handoff from the first carrier to the second carrier, thereby improving the metric associated with the first carrier.

In an alternate embodiment, an apparatus for balancing the call traffic (load) among a plurality of carriers in a multi-carrier wireless communication system using handoff is disclosed. The apparatus comprising a monitor which tracks one or a plurality of metrics corresponding to the quantity and/or quality of the load for each of the plurality of carriers. Operatively coupled to the monitor is a means for determining whether any of the metrics monitored has dropped below an acceptable threshold. Operatively coupled to the determining means is a handoff override device which, based upon the determining means, will identify a second carrier with available capacity and, overriding normal handoff mechanisms, will execute an immediate handoff of an preferential subscriber from the first carrier to the second carrier. In this manner, both the system capacity and the call quality are improved in accordance with the invention.

In yet a third embodiment, a multi-carrier wireless communication system dynamically balances the load of a plurality of subscribers among a plurality of carriers within a wireless communication system by monitoring the location of the subscribers within the network and, anticipating impending load imbalances, hands off a preferential subscriber from a first carrier to a second carrier within the system. In operation, such a system comprises a means for monitoring a load metric for each of a plurality of carriers in a multi-carrier wireless communication system operatively coupled to a location determination device. A controller unit receives input from at least the monitoring means and the location determination device to determine whether a handoff of any of the plurality of subscribers would improve overall system performance. If the controller, based upon the input received, determines that system performance would improve if a subscriber is reallocated, the controller instructs the communication system to select a preferential candidate subscriber and performs a handoff of the subscriber from a first carrier to a second carrier, thereby mitigating the performance degradation associated with a load imbalance in accordance with the invention.

FIG. 1 generally depicts, in flow diagram form, a prior art method for balancing the call traffic (load) among a plurality of carriers within a multi-carrier wireless communication system. In general, a multi-carrier wireless communication system which employs this method of static load balancing among the plurality of carriers merely determines the system loading at call initiation and assigns the call to an appropriate carrier. The determination of the appropriate carrier is typically limited to determining which carrier is the most lightly loaded at call initiation. The limitation to such a system, however, is that it does not take into account the dynamic nature of the users of such a system. In particular, the prior art systems will use a constant term to denote a "typical" subscriber's mobility and call duration in calculating the appropriate carrier to service the user.

Specifically, in step 102 of FIG. 1, a subscriber (also referred to as a user) attempts to access the multi-carrier wireless communication system. In step 104, the communication system determines the current system loading/ carrier availability for a plurality of carriers within the communication system. Next, the communication system will determine if there is a carrier available with which to accept the subscribers request for access, as depicted in step 106. If, at step 106 the communication system determines that it cannot accept another subscriber, it will deny the access attempt in step 108 and send the subscriber a "system busy" signal. Alternatively, if at step 106 the communication system determines that it has the capacity with which to accept another subscriber, it will assign the subscriber to an available carrier, as depicted in step 110. Finally, in step 112, after the subscriber has been assigned to a specific carrier, the communication system will complete the routing of the call.

The criterion with which the communication system determines whether to accept a subscriber, and to which channel to assign the subscriber, may vary among the many equipment providers. The determination to accept a subscriber may be made by monitoring the system rise (defined as the noise floor plus interference noise), signal to noise (S/N) ratio, or simply the number of calls currently being processed. Regardless of the criterion chosen, improvements can be made in the prior art systems that would allow for a dynamic, adaptive communication system which is more "forgiving" of the complexity of the wireless communication system operating environment. Such a system is described with reference to FIG. 2.

FIG. 2 generally depicts, in flow diagram form, a preferred embodiment for balancing the traffic load among a plurality of carriers within a multi-carrier wireless communication system performed in accordance with the invention. In this adaptive system, traffic load is monitored on a real-time basis and the communication system dynamically reallocates call traffic from over-burdened carriers to those carriers determined to have excess capacity.

The operation of the inventive method detailed in FIG. 2 is consistent with the prior art up through step 112. The method of FIG. 2 expands on the prior art where, in step 214, the communication system begins an iterative process of monitoring a load metric and, in 216, comparing the updated metric against a threshold. If the metric reaches the threshold, the communication system will, in step 220, handoff a preferential subscriber to a suitable alternative carrier. In this manner, the communication system mitigates the effects of the load imbalance in accordance with the invention.

To provide added flexibility, the threshold value of step 216 may be a fixed value, or alternatively it may be variable, depending on the system configuration. In communication systems where call traffic is rather steady, it may be preferable to set a constant threshold and never allow the load metric to drop below that threshold. In other communication systems, however, where there are periods of heavy call traffic, it may prove beneficial to use a variable threshold that would accommodate more subscribers at an albeit lower grade of service. In either instance, such flexibility is anticipated herein.

Figure 3:
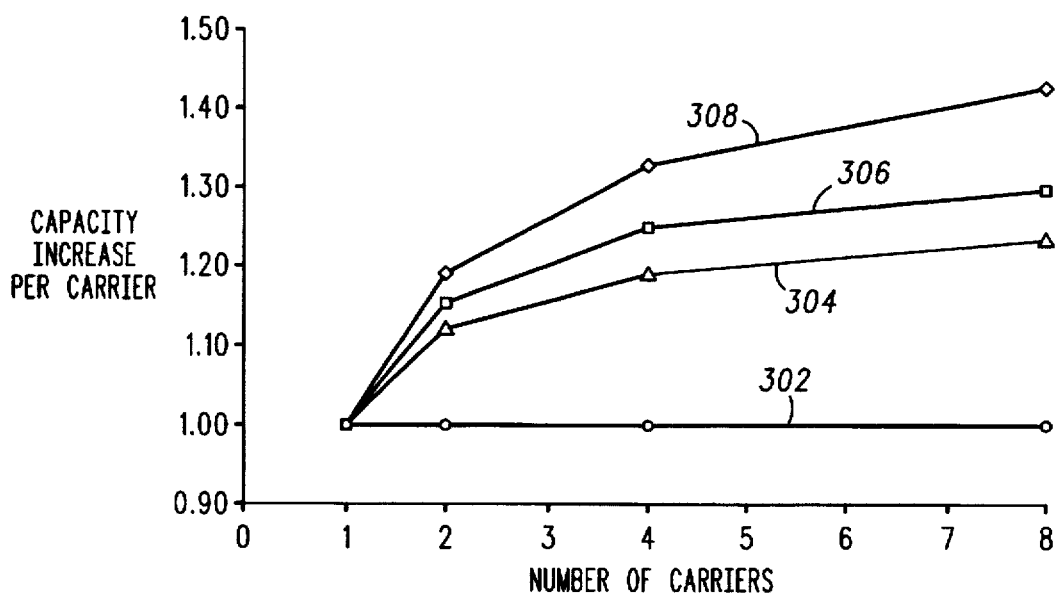
FIG. 3 generally depicts, in graphical form, simulation results of multi-carrier wireless communication system capacity using various methods of balancing the traffic load.

The improvement to be gained in system capacity has been simulated, the results of which are depicted in FIG. 3. In particular, FIG. 3 depicts, in graphical form, a comparison of multi-carrier wireless communication system capacity using various methods of load balancing. As depicted, the x-axis represents the number of carriers available in the multi-carrier system, while the y-axis represents the increase in capacity. Line 302 is representative of a communication system in which no load balancing is employed, whereas lines 304 and 306 represent a communication system wherein static load balancing is estimated at call initiation only. Finally, line 308 represents the capacity improvement that can be achieved in a communication system incorporating a dynamic load balancing system in accordance with the inventive method of FIG. 2.

The benefit of load balancing as depicted in FIG. 3 is best understood with reference to an example. As an example, assume that there are four different communication systems, each comprised of five carriers, but employing alternative methods of load balancing. In a first communication system, represented by line 302, no load balancing is used. The first system provides the baseline from which the improvement incurred as a result of load balancing is to be measured. A second communication system, represented by line 304 depicts a wireless communication system wherein load balancing is performed at call initiation using a mobility factor of two. The mobility factor, as described herein, is a constant term derived to define the number of communication cells a "typical" subscriber will traverse during a phone call minus one (e.g. if a typical subscriber will traverse three cells during the course of a phone call, the mobility factor would be two). Similarly, line 306 represents a third wireless communication system implementing static load balancing, performed at call initiation, using a mobility factor of one. Line 308 represents a fourth communication system implementing the dynamic load balancing method of FIG. 2, wherein load is continuously monitored and subscribers are shifted among the plurality of carriers as the need arises.

With continued reference to our example for FIG. 3, the simulation results reveal the capacity improvement realized through dynamic load balancing. As shown, system two, utilizing a static load balancing method assuming a mobility factor of two resulted in a 20% capacity improvement over that of the baseline system. Similarly, system three, utilizing a static load balancing method assuming a mobility factor of one resulted in a 25% capacity improvement over that of the baseline system. However, the most notable improvement was that observed for system four, utilizing the inventive dynamic load balancing method depicted in FIG. 2, where a 35% capacity improvement was achieved. Two conclusions may be drawn from the information presented: first, load balancing will improve the capacity characteristics of the wireless communication systems in which it is employed; and, second, the dynamic load balancing method of FIG. 2 provides more capacity improvement than that of the prior art methods.

Figure 4:
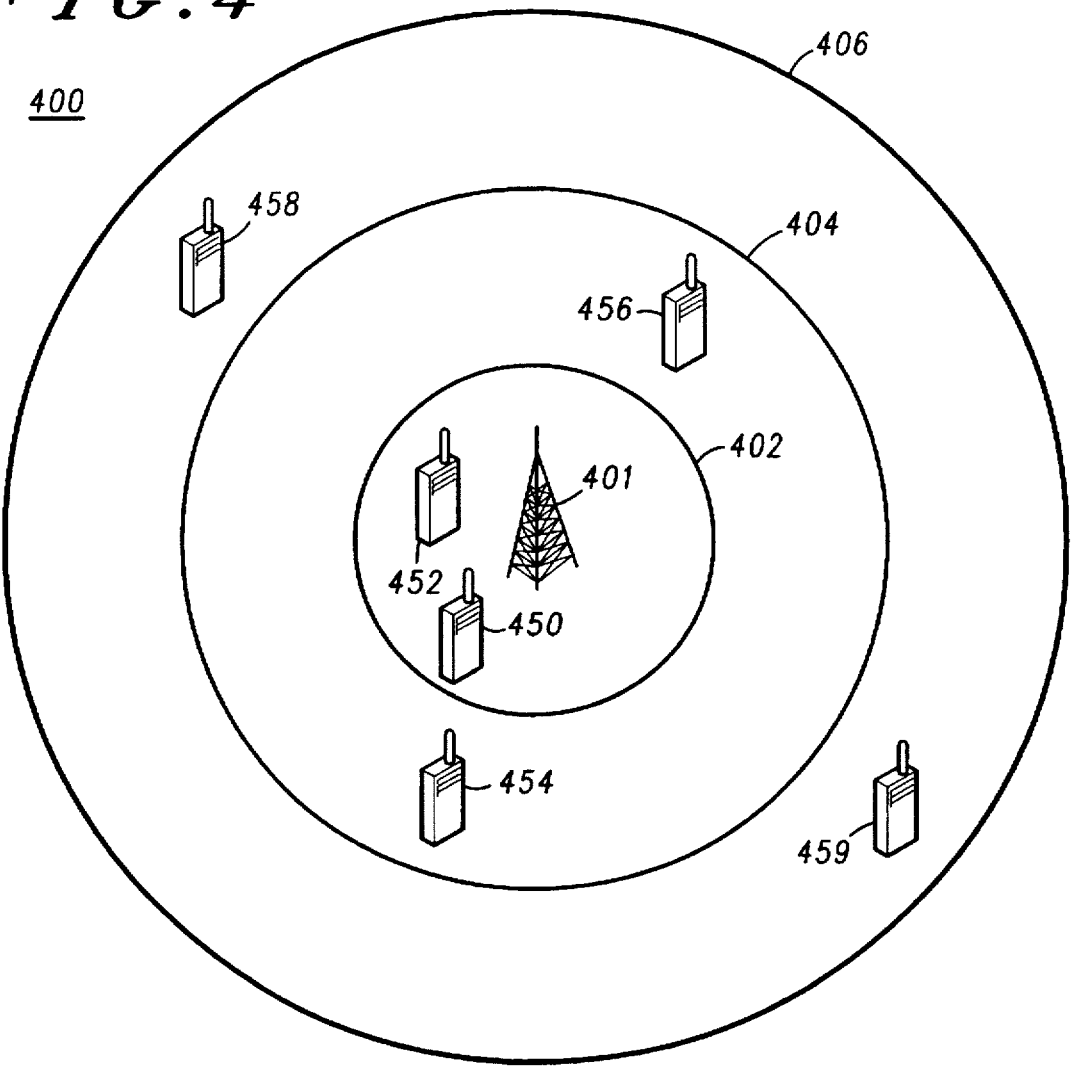
FIG. 4 generally depicts a representation of a wireless communication system, wherein the system subscribers are divided into class categories.

In an alternative embodiment, the multi-carrier wireless communication system may be configured to dynamically balance the load among different "class categories" of subscribers. The classes may be defined by any number of parameters such as, for example, forward power level requirements, call quality parameters, or service level parameters as defined by the operator. Referring to FIG. 4, the class categories (A, B, C) are defined by the area bounded by the concentric circles 402, 404, 406 around base site 401. In one embodiment, such as a digital cellular environment, the goal is to provide acceptable service at a low forward power level. Therefore, the class categories may preferably be defined by an upper limit of the forward link power required to service all subscribers within a particular class category. For example, the class category bounded by concentric circle 402 may be defined as all subscribers wherein the forward link power does not exceed a given power threshold. In this example, subscribers 450 and 452 would fall into the class A category. It should be noted that forward link power is but one method by which classes of subscribers could be defined and, although the class categories are depicted by concentric circles 402, 404 and 406, such representation is for ease of explanation only, the actual definition of class boundaries will depend on the measure by which the class category is defined.

With continued reference to FIG. 4, class category A contains subscribers 450 and 452, class category B contains subscribers 454 and 456, while class category C contains subscribers 458 and 459. In a CDMA wireless communication system, where there is but one channel within that portion of the system of interest, it is advantageous to keep the system rise at a minimum. In such a system, the dynamic load balancing system would work to balance the subscribers of the plurality of class categories evenly among the plurality of carriers within that portion of the system. For example, if there are two carriers in the portion of the wireless communication system depicted by 400, the dynamic load balancing system would work evenly distribute subscribers from each of the three class categories on each carrier. Therefore, the first carrier may contain subscribers 450, 454 and 459, while the second carrier would service subscribers 452, 456 and 458. As a result, the total system rise is lowered and the negative effects of a load imbalance within the communication system are mitigated.

Figure 5:
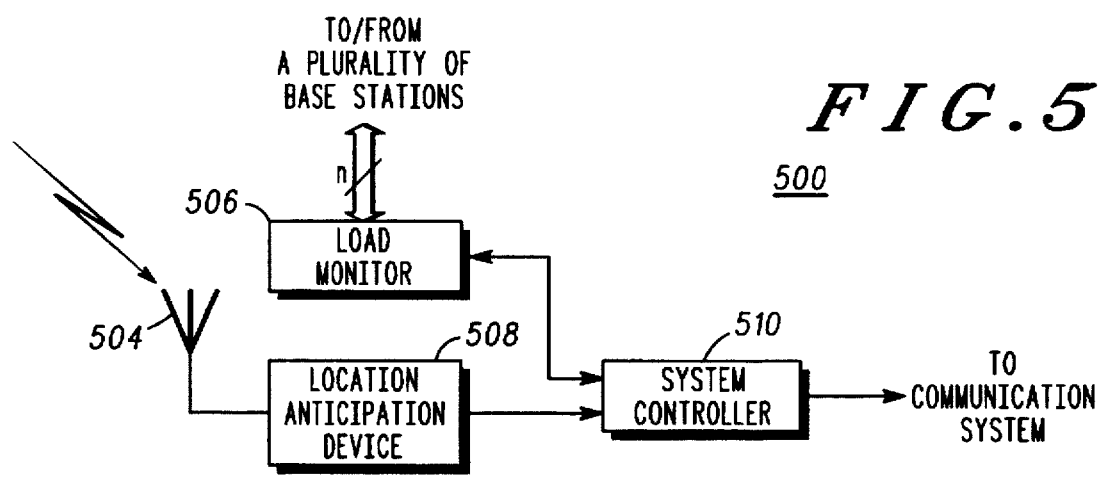
FIG. 5 generally depicts an apparatus for dynamically balancing the system load using a load metric and a location anticipation metric in accordance with the invention.

In yet another embodiment, FIG. 5 depicts an apparatus 500 operative within a wireless communication system wherein call traffic is dynamically redistributed among a plurality of carriers based on a load metric in combination with a location anticipation metric. In particular, FIG. 5 shows an apparatus 500 for balancing the load among a plurality of carriers within a wireless communication system, the apparatus comprising a load monitoring device 506, a location anticipation device 508 and a system controller 510, whereby the output of the load monitoring device 506 and the location anticipation device 508 are supplied to the system controller 510. The system controller 510 analyzes the load metric and the location anticipation metric and instructs the wireless communication system on the current loading and location of each of the plurality of carriers, including recommendations on which carriers need to shed subscribers and which carriers have excess capacity. Based on the output of the system controller 510, the wireless communication system selects a suitable candidate subscriber to handoff from a first carrier to a second carrier, thereby mitigating the negative effects of a load imbalance and improving system performance and capacity.

Although the invention has been particularly described in the text and represented in the figures with reference to a preferred embodiment, it will be appreciated by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What we claim is:

1. A method of dynamically balancing call traffic (load) of a plurality of subscribers among a plurality of carriers in a multicarrier wireless communication system, the plurality of subscribers in communication with a base-station via the plurality of carriers, the method comprising the steps of:

classifying each subscriber of the plurality of subscribers within the communication system into a class category based on a metric corresponding to each of the plurality of subscribers; and balancing the load of the plurality of subscribers among the plurality of carriers based on the class category of each of the plurality of subscribers.

2. The method of claim 1, wherein the step of balancing comprises the steps of:

determining the class category of each subscriber of the plurality of subscribers operating within the communication system;

distributing a subset of subscribers from each class category among each of the plurality of carriers.

3. A method of dynamically balancing call traffic (load) among a plurality of carriers in a multi-carrier wireless communication system, the method comprising:

monitoring a load metric for each of the plurality of carriers within the communication system;

calculating a location anticipation metric for each subscriber of a plurality of subscribers operating within the communication system; and balancing the load among the plurality of carriers based on the load metric and the location anticipation metric.

4. The method of claim 3, wherein the location anticipation metric is comprised of a subscriber's location, speed and direction of travel.

5. The method of claim 4, the step of balancing further comprising:

determining that a load metric corresponding to a first carrier of the plurality of carriers has reached a threshold;

calculating a location anticipation metric corresponding to a subscriber of the plurality of subscribers which indicates that the subscriber is a suitable candidate subscriber; and performing a handoff of the suitable candidate subscriber from the first carrier to a second carrier based on the steps of determining and calculating.

6. An apparatus for dynamically balancing call traffic (load) among a plurality of carriers in a multi-carrier wireless communication system, the apparatus comprising:

means for monitoring a load metric for each of the plurality of carriers within the communication system;

means for calculating a location anticipation metric for each subscriber of a plurality of subscribers operating within the communication system; and means for balancing the load among the plurality of carriers based on the load metric and the location anticipation metric.

7. The apparatus of claim 6, wherein the location anticipation metric is comprised of a subscriber's location, speed and direction of travel.

8. The apparatus of claim 6, wherein the means for balancing further comprises:

means for determining that a load metric corresponding to a first carrier of the plurality of carriers has reached a threshold;

means for calculating a location anticipation metric corresponding to a subscriber of the plurality of subscribers which indicates that the subscriber is a suitable candidate subscriber; and means for performing a handoff of the suitable candidate subscriber from the first carrier to a second carrier based on the steps of determining and calculating.

* * * * *